US008699426B2

(12) United States Patent
Gaal et al.

(10) Patent No.: US 8,699,426 B2
(45) Date of Patent: Apr. 15, 2014

(54) METHOD AND APPARATUS FOR RESOURCE ALLOCATION IN WIRELESS COMMUNICATION SYSTEMS

(75) Inventors: Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 984 days.

(21) Appl. No.: 12/411,292

(22) Filed: Mar. 25, 2009

(65) Prior Publication Data

US 2009/0279493 A1 Nov. 12, 2009

Related U.S. Application Data

(60) Provisional application No. 61/039,734, filed on Mar. 26, 2008.

(51) Int. Cl.
 *H04W 4/00* (2009.01)
(52) U.S. Cl.
 USPC .......................................... 370/329; 370/208
(58) Field of Classification Search
 USPC ......... 370/203, 208, 209, 310, 328, 329, 330, 370/431, 436, 441
 See application file for complete search history.

(56) References Cited

U.S. PATENT DOCUMENTS

| | | | |
|---|---|---|---|
| 7,706,350 B2 | 4/2010 | Gorokhov et al. | |
| 2002/0085619 A1* | 7/2002 | Cho et al. ....................... | 375/130 |
| 2007/0171849 A1* | 7/2007 | Zhang et al. ................... | 370/310 |
| 2009/0196229 A1* | 8/2009 | Shen et al. ..................... | 370/328 |
| 2009/0232067 A1* | 9/2009 | Pajukoski et al. ............. | 370/329 |
| 2013/0155982 A1 | 6/2013 | Gaal et al. | |

FOREIGN PATENT DOCUMENTS

| | | |
|---|---|---|
| AU | 2009211468 A1 | 8/2009 |
| CA | 2712938 A1 | 8/2009 |
| CN | 1954534 A | 4/2007 |
| CN | 201004702 Y | 1/2008 |
| JP | 2010536229 A | 11/2010 |
| RU | 2234193 C2 | 8/2004 |
| TW | I269543 B | 12/2006 |
| TW | I269545 B | 12/2006 |

(Continued)

OTHER PUBLICATIONS

International Search Report—PCT/US2009/038364—International Search Authority—European Patent Office, Apr. 8, 2010.

(Continued)

*Primary Examiner* — Chi Pham
*Assistant Examiner* — Weibin Huang
(74) *Attorney, Agent, or Firm* — Larry Moskowitz

(57) ABSTRACT

Systems and methodologies are described that facilitate resource allocation and management in a wireless communication system. As described herein, a resource grid structure can be utilized to allocate resources for respective users corresponding to a given channel (e.g., a Physical Uplink Control Channel (PUCCH)). The resource grid can be constructed using one or more cyclic shifts and a set of four orthogonal covers to provide improved efficiency in resource usage. Further, slots in the resource grid can be allocated to respective users based on user indexes via one or more resource allocation functions. For example, a resource allocation function can step along a first orthogonal cover at increasing cyclic shifts, alternate between second and fourth orthogonal covers at increasing cyclic shifts upon exhaustion of the first orthogonal cover, and step through a third orthogonal cover at increasing cyclic shifts upon exhaustion of the second and fourth orthogonal covers.

31 Claims, 14 Drawing Sheets

(56) References Cited

FOREIGN PATENT DOCUMENTS

| WO | WO2006099225 A1 | 9/2006 |
| WO | WO2007011180 A1 | 1/2007 |
| WO | WO2007119542 A1 | 10/2007 |
| WO | 2009020376 A2 | 2/2009 |
| WO | WO2009098187 A2 | 8/2009 |

OTHER PUBLICATIONS

Nokia Siemens Networks et al: "ACK/NACK Channelization for PRBs Containing Both ACK/NACK and CQI," 3GPP Draft; R1-080931, 3rd Generation Partnership Project (3GPP), Mobile Competence Centre, Feb. 5, 2008.

Texas Instruments: "Simultaneous CQI and ACK/NAK Transmission in Uplink," 3GPP Draft; r1-073431-CQIACK, 3rd Generation Partnership Project (3GPP), Mobile Competence Centre, Aug. 15, 2007.

Written Opinion—PCT/US2009/038364, International Search Authority, European Patent Office, Apr. 8, 2010.

Ericsson: "PUCCH frequency hopping in TDD frame structure type 2", 3GPP TSG RAN WG1 Neeting#50, R1-073732, Aug. 15, 2007, pp. 1-4, <URL:http://www.3gpp.org/ftp/tsg_ran/WG1_RL1/TSGR1_50/Docs/R1-073732.zip>.

Etri: "Sequence allocation and hopping for uplink ACK/NAK channels", 3GPP TSG RAN WG1 Meeting#50, R1-073413, Aug. 15, 2007, pp. 1/6-6/6, <URL:http://www.3gpp.org/ftp/tsg_ran/WG1_RL1/TSGR1_50/Docs/R1-073413.zip>.

Panasonic, Texas Instruments: "Usage of Cyclic Shifts and block-wise spreading codes for Uplink ACK/NACK", 3GPP TSG RAN WG1 Meeting#50, R1-073618, Aug. 15, 2007, pp. 1/5-5/5, <URL:http://www.3gpp.org/ftp/tsg_ran/WG1_RL1/TSGR1_50/Docs/R1-073618.zip>.

Taiwan Search Report—TW098109961—TIPO—Sep. 18, 2012.

\* cited by examiner

500 ⟶

| Cyclic Shift $n_{cs}(n_s)$ | ACK/NACK Orthogonal Cover | | | |
|---|---|---|---|---|
| | $n_{oc}(n_s) = 0$ | $n_{oc}(n_s) = 1$ | $n_{oc}(n_s) = 2$ | $n_{oc}(n_s) = 3$ |
| 0 | $n'(n_s) = 0$ | | 12 | |
| 1 | | 6 | | |
| 2 | 1 | | 13 | |
| 3 | | | | 7 |
| 4 | 2 | | 14 | |
| 5 | | 8 | | |
| 6 | 3 | | 15 | |
| 7 | | | | 9 |
| 8 | 4 | | 16 | |
| 9 | | 10 | | |
| 10 | 5 | | 17 | |
| 11 | | | | 11 |

| Cyclic Shift $n_{cs}(n_s)$ | ACK/NACK Orthogonal Cover | | | |
|---|---|---|---|---|
| | $n_{oc}(n_s) = 0$ | $n_{oc}(n_s) = 1$ | $n_{oc}(n_s) = 2$ | $n_{oc}(n_s) = 3$ |
| 0 | $n'(n_s) = 0$ | | | |
| 1 | | 4 | | |
| 2 | | | 8 | |
| 3 | 1 | | | |
| 4 | | | | 5 |
| 5 | | | 9 | |
| 6 | 2 | | | |
| 7 | | 6 | | |
| 8 | | | 10 | |
| 9 | 3 | | | |
| 10 | | | | 7 |
| 11 | | | 11 | |

| Cyclic Shift $n_{cs}(n_s)$ | ACK/NACK Orthogonal Cover | | | |
|---|---|---|---|---|
| | $n_{oc}(n_s) = 0$ | $n_{oc}(n_s) = 1$ | $n_{oc}(n_s) = 2$ | $n_{oc}(n_s) = 3$ |
| 0 | $n'(n_s) = 0$ | 12 | 24 | |
| 1 | 1 | | 25 | 13 |
| 2 | 2 | 14 | 26 | |
| 3 | 3 | | 27 | 15 |
| 4 | 4 | 16 | 28 | |
| 5 | 5 | | 29 | 17 |
| 6 | 6 | 18 | 30 | |
| 7 | 7 | | 31 | 19 |
| 8 | 8 | 20 | 32 | |
| 9 | 9 | | 33 | 21 |
| 10 | 10 | 22 | 34 | |
| 11 | 11 | | 35 | 23 |

FIG. 7

METHOD AND APPARATUS FOR RESOURCE ALLOCATION IN WIRELESS COMMUNICATION SYSTEMS

CROSS-REFERENCE

This application claims the benefit of U.S. Provisional Application Ser. No. 61/039,734, filed Mar. 26, 2008, and entitled "METHOD AND APPARATUS FOR RESOURCE ALLOCATION IN WIRELESS COMMUNICATION SYSTEMS," the entirety of which is incorporated herein by reference.

BACKGROUND

I. Field

The present disclosure relates generally to wireless communications, and more specifically to techniques for allocation of resources in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

For some signaling channels used in a wireless communication system, such as the Physical Uplink Control Channel (PUCCH), channel resources can be allocated in a way that enables multiple users to be multiplexed onto the channel resources. For example, multiple users can be multiplexed onto a set of resources in frequency and time corresponding to a channel by varying cyclic shifts, Walsh codes and/or other orthogonal covers, and/or other properties of resources respectively allocated to the users. However, existing techniques for resource allocation are subject to a loss of orthogonality due to channel dispersion and/or other similar causes, which can result in interference between users, a decrease in the number of users that can be multiplexed onto a set of channel resources, and/or other negative effects on the performance of the system. Accordingly, it would be desirable to implement resource allocation techniques for a wireless communication system that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for resource allocation in a wireless communication system is described herein. The method can comprise identifying a set of acknowledgement (ACK)/negative acknowledgement (NACK) resources; generating a resource grid corresponding to the set of ACK/NACK resources, wherein the resource grid has a first dimension corresponding to one or more cyclic shifts and a second dimension corresponding to four orthogonal covers; and multiplexing one or more users onto the identified set of ACK/NACK resources at least in part by allocating resources corresponding to respective positions in the resource grid to respective users in the one or more users.

Another aspect described herein relates to a wireless communications apparatus. The wireless communications apparatus can comprise a memory that stores data relating to ACK channel resources, a set of user equipments (UEs) to be allocated ACK channel resources, and a set of four orthogonal covers; and a processor configured to generate a grid for the ACK channel resources having a first dimension corresponding to one or more cyclic shifts and a second dimension corresponding to the four orthogonal covers and to allocate ACK channel resources corresponding to respective slots in the resource grid to respective UEs.

A third aspect relates to an apparatus that facilitates resource allocation in a wireless communication system. The apparatus can comprise means for identifying a set of ACK/NACK resources; and means for generating a resource grid structure for allocation of the identified ACK/NACK resources, wherein the resource grid structure is defined with respect to at least one cyclic shift and four orthogonal covers.

A fourth aspect relates to a computer program product, which can comprise a computer-readable medium that comprises code for causing a computer to generate a resource grid for a Physical Uplink Control Channel (PUCCH) at least in part by defining a first dimension of the resource grid in terms of at least one cyclic shift and defining a second dimension of the resource grid in terms of four orthogonal covers; and code for causing a computer to allocate slots in the resource grid to respective terminals to which PUCCH resources are to be assigned.

A fifth aspect described herein relates to a method used in a wireless communication system. The method can comprise generating a resource grid corresponding to PUCCH resources, wherein a first dimension of the resource grid is defined by twelve cyclic shifts in time and a second dimension of the resource grid is defined by four orthogonal covers in code; identifying a shift increment parameter; assigning increasing resource indexes to respective UEs to be allocated PUCCH resources; and allocating PUCCH resources to the indexed UEs at least in part by allocating respective slots in the resource grid to respective UEs according to at least one resource allocation function that steps along a first orthogonal cover in the resource grid at increasing cyclic shifts as a function of the shift increment parameter, alternates between second and fourth orthogonal covers at increasing cyclic shifts in the resource grid as a function of the shift increment parameter upon exhaustion of the first orthogonal cover, and steps through a third orthogonal cover in the resource grid at increasing cyclic shifts as a function of the shift increment parameter upon exhaustion of the second and fourth orthogonal covers.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

BRIEF DESCRIPTION OF THE DRAWINGS

FIGS. 5-7 illustrate example resource allocations that can be performed in accordance with various aspects.

DETAILED DESCRIPTION

Figure 1:
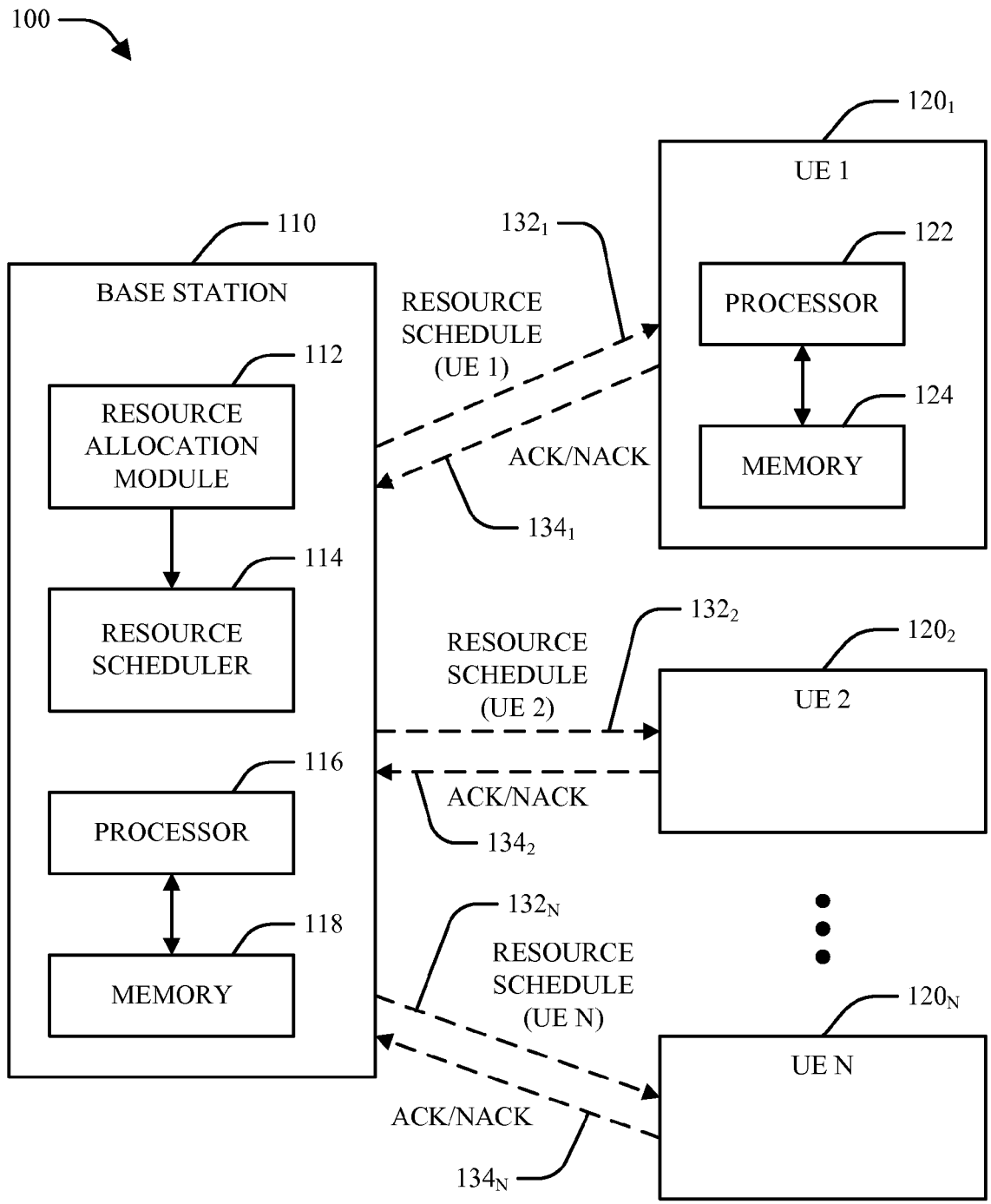
FIG. 1 is a block diagram of a system for allocating and managing resources in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for allocating and managing resources in a wireless communication system in accordance with various aspects described herein. As FIG. 1 illustrates, system 100 can include one or more base stations 110 that can communicate with one or more user equipments (UEs) 120. While only one base station 110 is illustrated in system 100, it should be appreciated that system 100 can include any number of base stations. Further, it should be appreciated that respective UEs 120 within system 100 can communicate with all, some, or none of the base stations 110 present in system 100. For example, base station(s) 110 in system 100 can correspond to respective cell(s) and/or area(s) of coverage within system 100 such that a UE 120 can communicate with one or more base stations 110 designated to serve an area at which the UE 120 is located.

In accordance with one aspect, base station 110 can allocate resources to be utilized by one or more UEs 120 for uplink (UL, also referred to herein as reverse link (RL)) communication back to base station 110. In one example, resources allocated by base station 110 for UEs 120 can include resources for ACK/NACK signaling corresponding to data and/or other information transmitted by base station 110 to UEs 120 on the downlink (DL, also referred to herein as forward link (FL)) and/or any other suitable type of resources. In another example, these resources can be allocated at base station 110 using a resource allocation module 112 and/or another suitable module. While resource allocation module 112 is illustrated as located at base station 110, it can be appreciated that resource allocation module 112 could alternatively be associated with one or more UEs 120, a standalone entity within system 100, and/or any other entities in system 100.

In accordance with another aspect, based on resources allocated for respective UEs 120 by resource allocation module 112, a resource scheduler 114 can determine and/or generate assignments for the allocated resources. These assignments can subsequently be transmitted to UE(s) 120 as resource schedules 132 corresponding to the respective UE(s) 120. In the example illustrated by system 100, resource schedules 132 can be individually tailored and transmitted for respective UEs 120. However, it should be appreciated that resource schedules 132 can alternatively be constructed as multicast or broadcast messages to multiple ULEs 120.

Upon receiving a resource schedule 132, a UE 120 can configure its transmissions to utilize resources provided to the UE 120 in the resource schedule 132. Subsequently, a UE 120 can transmit ACK/NACK information 134 and/or other suitable types of data, control signaling, or the like to base station 110 on the uplink using the resources provided in the corresponding resource schedule 132.

As further illustrated in system 100, base station 110 can include a processor 116 and/or memory 118 that can implement some or all of the functionality of resource allocation module 112, resource scheduler 114, and/or any other functionality of base station 110. Similarly, UEs 120 can include a processor 122 and/or memory 124 that can be utilized to implement some or all of the functionality described herein. While only one UE 120 is illustrated in system 100 as including a processor 122 and memory 124 for brevity, it should be appreciated that any UE 120 in system 100 could include a processor 122 and/or memory 124.

Figure 2:
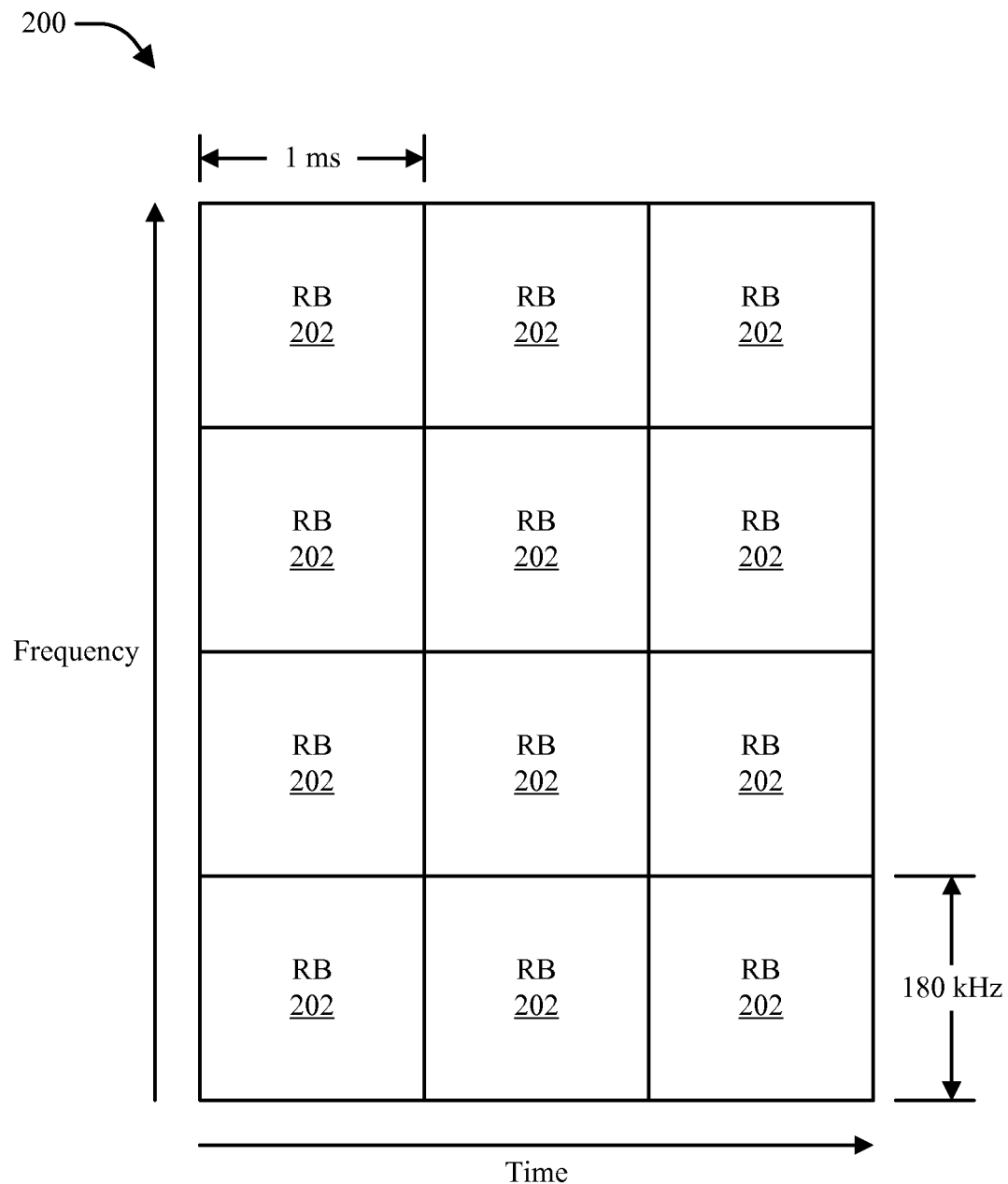
FIG. 2 illustrates an example resource structure that can be utilized within a wireless communication system.

Turning to FIG. 2, a diagram 200 is provided that illustrates an example resource structure that can be utilized within a wireless communication system in accordance with various aspects described herein. In accordance with one aspect, system resources can be defined in terms of both time and frequency. Accordingly, as diagram 200 illustrates, system resources can be structured as a grid having dimensions respectively defined by time intervals and frequency intervals. For example, as diagram 200 illustrates, system resources can be divided into resource blocks (RBs) 202, which can be respectively correspond to 180 kHz and/or any other appropriate size in frequency over 1 ms in time, 0.5 ms in time, and/or any other suitable time duration. It should be appreciated, however, that the resource structure illustrated by diagram 200 is merely one example of a manner in which system resources can be utilized and that system resources can be divided in any appropriate manner (e.g., in any number of uniform or non-uniform RBs 202 and/or other units). Further, while diagram 200 illustrates 12 RBs 202, it should be appreciated that a system bandwidth can occupy any suitable frequency band, and that some or all of the system bandwidth can be utilized over any suitable time interval(s).

In accordance with another aspect, various portions of a frequency band associated with a wireless communication system can be allocated to respective channels as a function of position within the frequency band. For example, frequency channels used for transmission of data can be placed near the center of a system frequency band, while data used for control information, such as a Physical Uplink Control Channel (PUCCH), can be placed near one or more edges of the frequency band. In one example, PUCCH can be utilized to carry ACK/NACK information from terminals (e.g., UEs 120) to one or more base stations (e.g., base station 110) serving the terminals.

Figure 3:
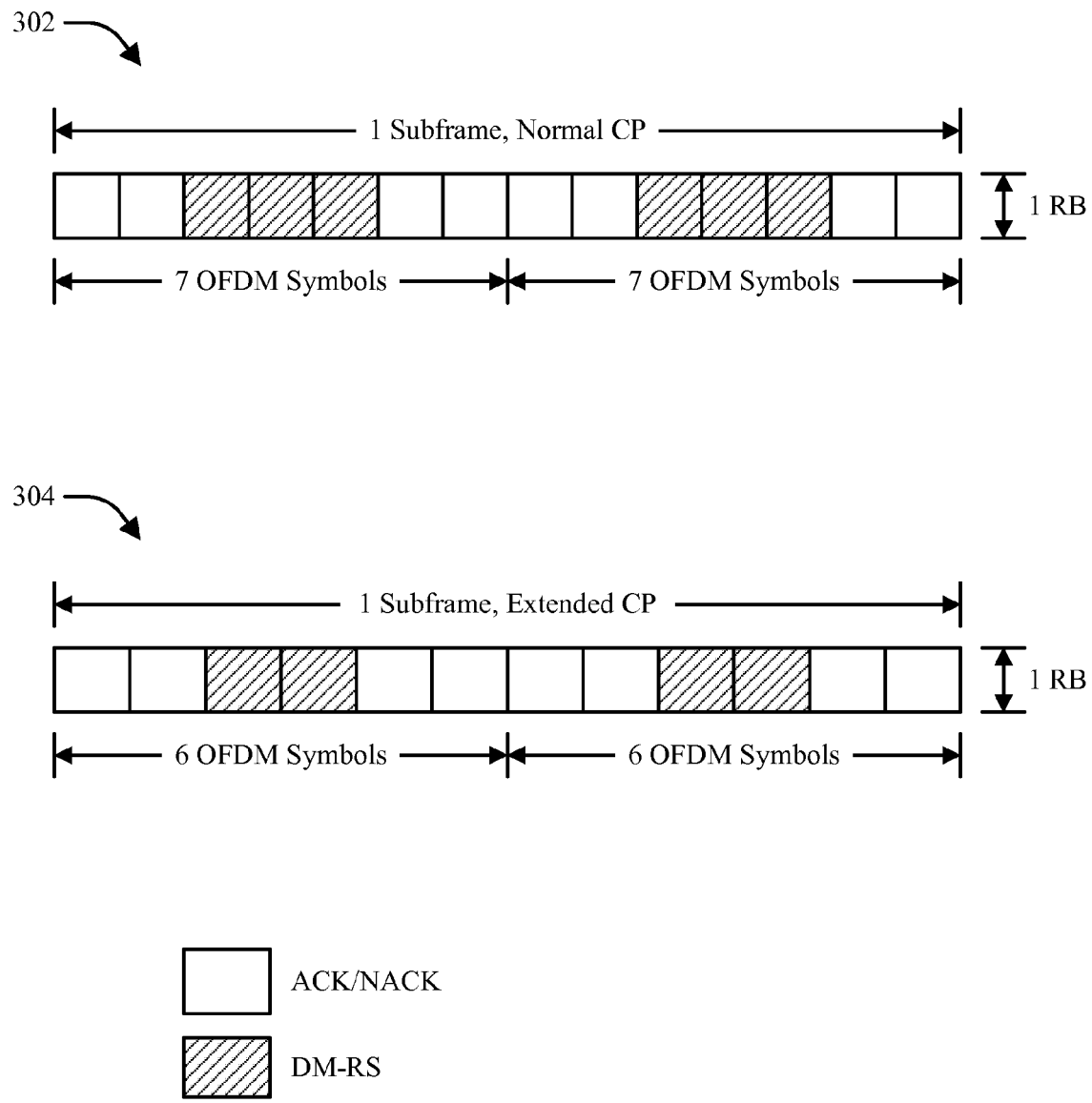
FIG. 3 illustrates an example channel structure that can be utilized within a wireless communication system.

Example structures that can be utilized for PUCCH are illustrated in diagrams 302 and 304 in FIG. 3. By way of specific, non-limiting example, the PUCCH structures illustrated by diagrams 302 and 304 can be utilized to implement PUCCH format 1A and/or a variation thereof, which can enable a terminal and/or another device utilizing the channel to transmit one control bit per subframe utilizing Binary Phase Shift Keying (BPSK) and/or another suitable modulation scheme; PUCCH format 1B and/or a variation thereof, which can enable a terminal and/or another device utilizing the channel to transmit two control bits per subframe utilizing Quadrature Phase Shift Keying (QPSK) and/or another suitable modulation scheme; and/or any other suitable channel format. It should be appreciated that diagrams 302 and 304 are provided by way of example and not limitation and that any suitable types and/or arrangement of information can be utilized in implementing the resource allocation techniques described herein.

In one example, the PUCCH structures illustrated by diagrams 302 and 304 can utilize one or more modulated Zadoff-Chu (ZC) sequences, on which Walsh codes and/or other additional time domain orthogonal covers can be applied to yield respective transmissions of 8 modulations symbols per subframe. Accordingly, in the specific examples of PUCCH formats 0 and 1, PUCCH format 0 can provide a code rate of (8, 1) for ACK/NACK and/or other suitable information using BPSK modulation, and PUCCH format 1 can provide a code rate of (16, 2) for ACK/NACK and/or other appropriate information using QPSK modulation. In one example, PUCCH format 0 can be utilized for ACK information corresponding to a single stream, while PUCCH format 1 can be utilized for ACK information corresponding to two streams (e.g., associated with a multiple-input multiple-output (MIMO) transmission utilizing two MIMO codewords).

Diagram 302 illustrates an example PUCCH implementation for a normal cyclic prefix (CP) case. As illustrated by diagram 302, PUCCH resources in a subframe can be divided in time into 14 Orthogonal Frequency Division Multiplexing (OFDM) symbols, which can be divided into two slots containing 7 OFDM symbols each and/or allocated between ACK/NACK transmission and a pilot or demodulation reference signal (DM-RS). As diagram 302 further illustrates, an ACK/NACK transmission can be arranged to utilize the first and last two OFDM symbols in each slot, with the remainder of the symbols utilized for DM-RS. As diagram 302 further illustrates, the PUCCH resources can utilize frequency resources equivalent to 1 RB (e.g., 180 kHz).

Similarly, diagram 304 illustrates an example PUCCH implementation for an extended CP case, wherein control channel resources are divided in time into 12 OFDM symbols per subframe and/or 6 OFDM symbols per slot. In one example, the difference in CP length between the normal CP case illustrated by diagram 302 and the extended CP case illustrated by diagram 304 accounts for the difference in modulation symbols allocated in the respective cases. As diagram 304 illustrates, an ACK/NACK transmission can be arranged in an extended CP case to utilize the first and last two OFDM symbols in each slot, with the remainder of the modulation utilized for DM-RS, in a similar manner to that illustrated by diagram 302 for the normal CP case. In addition, PUCCH resources for the extended CP case can utilize frequency resources corresponding to 1 RB in a similar manner to the normal CP case illustrated by diagram 302.

Figure 4:
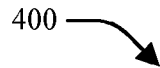
FIG. 4 illustrates example resource grids that can facilitate allocation of resources to respective system users in accordance with various aspects.

In accordance with one aspect, an ACK/NACK transmission for a given user can be configured to utilize fewer than all of the resources provided by PUCCH and/or other corresponding channels. As a result, multiple users can be multiplexed onto PUCCH and/or other suitable resources for ACK/NACK transmission in order to improve resource usage efficiency. In one example, multiplexing can be performed for both pilot (e.g., DM-RS) and data resources, as illustrated in diagram 400 in FIG. 4. As diagram 400 illustrates, resource grids 402 and 404 can be generated for pilot and data resources, respectively. In one example, resource grids 402 and 404 can be defined in a first dimension (e.g., vertical size in rows) by varying cyclic shifts that can be applied to a user transmission and in a second dimension (e.g., horizontal size in columns) by a set of Walsh codes and/or other orthogonal covers applied to OFDM symbols corresponding to the channel (e.g., as illustrated by FIG. 3).

In one example, cyclic shifts as utilized in grids 402 and 404 can be applied to a signal originating from a given user to shift the signal in time by a predetermined time interval. In another example, signals originating from respective users can be constructed to utilize a uniform duration, and cyclic shifts can be applied to respective signals to delay signals from given users at uniform intervals within the signal duration. As a specific, non-limiting example, a pilot and/or data signal can be constructed to have a duration of 66.67 µs in time, based on which 12 cyclic shifts can be applied that respectively correspond to 5.56 µs intervals within the 66.67 µs signal. In one example, a signal utilized by respective users can be selected such that a first instance of the signal transmitted using a given cyclic shift (e.g., by a first user) will have substantially perfect autocorrelation with a second instance of the signal transmitted using a different cyclic shift (e.g., by a second user). Thus, it can be appreciated that a signal can be chosen such that it exhibits orthogonality with cyclic shifted versions of itself, thereby allowing the signal to be applied to map multiple users to a common set of OFDM symbols and a common orthogonal cover.

In another example, orthogonal covers can be orthogonal sequences that are applied to signals transmitted by a user over pilot and/or data OFDM signals in a subframe (e.g., as illustrated by FIG. 3) in order to enable multiple users to be multiplexed in code over a common time period. For example, orthogonal covers corresponding to pilot resource grid 402 can be applied based on a spreading vector that can be defined as follows:

$$\begin{bmatrix} 1 & 1 & 1 \\ 1 & \alpha & \alpha^2 \\ 1 & \alpha^2 & \alpha \end{bmatrix},$$

where $$\alpha = e^{\frac{-2\pi}{3}j}.$$

Similarly, a set of three orthogonal covers corresponding to data resource grid 404 can be defined as shown below in Table 1:

TABLE 1

Orthogonal sequences for data transmission, 3 orthogonal covers.

| Sequence Index | Orthogonal Sequence |
| --- | --- |
| 0 | [+1 +1 +1 +1] |
| 1 | [+1 −1 +1 −1] |
| 2 | [+1 −1 −1 +1] |

In accordance with one aspect, users can be assigned resources corresponding to slots in resource grid 402 and/or 404, which in turn correspond to a predefined orthogonal cover transmitted at a given cyclic shift. In existing wireless communication system implementations, a 3×12 pilot resource grid 402 and a 3×12 data resource grid 404 is used, which correspond to 12 cyclic shifts and 3 orthogonal covers and facilitate the use of up to 36 resource slots for both pilot and data transmissions.

Accordingly, assuming a perfect channel with no multipath fading, delay spreading, or other factors, signals corresponding to each of the 36 slots at resource grids 402 and 404 can be kept orthogonal such that 36 users could be scheduled on grids 402 and 404 with substantially no interference. However, if multipath fading, delay spreading, or other such factors are present for a channel corresponding to grids 402 and 404, it can be appreciated that signals corresponding to adjacent resource slots could interfere with each other in some circumstances. For example, in the cyclic shift direction on grids 402 and 404, data and/or pilot slots can be created using a time domain variation applied to a transmitted signal. However, if the transmitted signals experience fading, it can be appreciated that interference can result. For example, if a first user transmits a signal at a given cyclic shift and a second user transmits a signal at a cyclic shift near the cyclic shift of the first user, the signals transmitted by the two users can interfere with each other if they fade differently. As another example, respective cyclic shifts on grids 402 and 404 can correspond to a uniform time delay (e.g., 5.56 µs). However, if the associated channel has a delay spread that coincides with the cyclic shift interval (e.g., a 5.56 µs delay spread), an entity receiving signals from multiple users may be unable in some circumstances to distinguish between a signal from a first user at a given cyclic shift or a delayed version of a signal from a second user at an earlier cyclic shift. Similarly, signals transmitted by respective users at a common cyclic shift using different orthogonal covers can interfere with each other under various circumstances.

As a result of the interference described above, it can be appreciated that signals can be required to be spread out among the slots in resource grids 402 and 404 in order to avoid excessive interference, which can further limit the amount of users that can be scheduled on grids 402 and 404. Conventionally, this can be accomplished by utilizing resource allocation functions and/or other means for scheduling user transmissions at predefined intervals within a grid 402 and/or 404. However, it can be appreciated that by spreading the resources allocated on a grid 402 and/or 404, the number of users that can be scheduled may be substantially limited.

Thus, in accordance with one aspect, a data resource grid 404 can be configured to utilize a set of four orthogonal covers, thereby allowing additional data transmissions to take place in an associated wireless communication system. These additional transmissions can correspond to, for example, additional users and/or additional data to be transmitted by pre-scheduled users (e.g., for additional ACK/NACK bits, etc.). In one example, a set of four orthogonal covers utilized for a data resource grid 404 can be created to span a set of four data OFDM symbols corresponding to a subframe structure utilized for PUCCH and/or other similar channels (e.g., as illustrated by diagrams 302 and 304). By doing so, it can be appreciated that the four-orthogonal cover data resource table 404 described herein can be configured to make more efficient use of data resources provided for transmission. In one example, orthogonal sequences corresponding to a set of four orthogonal covers can be defined as shown in Table 2 below:

TABLE 2

Orthogonal sequences for data transmission, 4 orthogonal covers.

| Sequence Index | Orthogonal Sequence |
|---|---|
| 0 | [+1 +1 +1 +1] |
| 1 | [+1 −1 +1 −1] |
| 2 | [+1 −1 −1 +1] |
| 3 | [+1 +1 −1 −1] |

In one example, a set of resource allocation functions can be defined to map respective users to resources corresponding to slots in data resource grid 404. In accordance with one aspect, the resource allocation functions can be utilized to assign resource slots in the data resource grid 404 in a predefined order. By way of specific, non-limiting example for a resource grid 404 with four orthogonal covers, users to be assigned resources in data resource grid 404 can be assigned unique indexes. Subsequently, in order based on the respective indexes, users can be allocated resources that correspond to increasing cyclic shifts in the column associated with the first orthogonal cover (e.g., orthogonal cover 0). Following exhaustion of all available cyclic shifts for the first orthogonal cover, increasing cyclic shifts can be allocated in an alternating manner between the columns corresponding to the second and fourth orthogonal covers (e.g., orthogonal covers 1 and 3). Finally, following exhaustion of the available resource slots for the second and fourth orthogonal covers, resource slots corresponding to increasing cyclic shifts in the column associated with the third orthogonal cover (e.g., orthogonal cover 2) can be assigned.

In accordance with one aspect, the above example resource allocation functions can be defined as follows:

$$n_{oc}(n_s) = \begin{cases} \left\lfloor \dfrac{n'(n_s) \cdot}{\Delta_{shift}^{PUCCH}/N'} \right\rfloor + (n'(n_s) \bmod 2) & \text{for normal } CP \\ 2 \cdot \left( \left\lfloor \dfrac{n'(n_2) \cdot}{\Delta_{shift}^{PUCCH}/N'} \right\rfloor \bmod 2 \right) \\ 2 \cdot \lfloor n'(n_s) \cdot \Delta_{shift}^{PUCCH}/N' \rfloor & \text{for extended } CP \end{cases}$$

$$\alpha(n_s) = 2\pi \cdot n_{cs}(n_s)/N_{sc}^{RB}$$

$$n_{cs}(n_s) = \begin{cases} \left[ \begin{array}{l} n_{cs}^{cell}(n_s, l) + \\ \left( \begin{array}{l} n'(n_s) \cdot \Delta_{shift}^{PUCCH} + \\ \delta_{offset}^{PUCCH} + \\ \left( \dfrac{(n_{oc}(n_s) - 2 \cdot \lfloor n_{oc}(n_s)/3 \rfloor)}{\bmod \Delta_{shift}^{PUCCH}} \right) \end{array} \right) \bmod N' \end{array} \right] \bmod N_{sc}^{RB} & \text{for normal } CP \\ \left[ \begin{array}{l} n_{cs}^{cell}(n_s, l) + \\ \left( \begin{array}{l} n'(n_s) \cdot \Delta_{shift}^{PUCCH} + \\ \delta_{offset}^{PUCCH} + n_{oc}(n_s)/2 \end{array} \right) \bmod N' \end{array} \right] \bmod N_{sc}^{RB} & \text{for extended } CP, \end{cases}$$

where $n_s$ represents a slot index, $n'(n_s)$ represents a resource index assigned to a user, $n_{oc}(n_s)$ corresponds to an orthogonal cover index associated with an allocated slot in resource grid 404, and $n_{cs}(n_s)$ corresponds to a cyclic shift index associated with an allocated slot in resource grid 404. Thus, it can be appreciated that by utilizing the above equations, a $n'(n_s)$-th user can be assigned a $n_{oc}(n_s)$-th column and a $n_{cs}(n_s)$-th row in resource grid 404. In one example, N' represents the number of rows and/or cyclic shifts in resource grid 404 that are to be utilized for resource allocation. Thus, if the entire resource grid 404 is to be allocated, N' can be equal to the number of rows in the resource grid (e.g., 12). Alternatively, if a portion of the resource grid 404 is to be utilized for other purposes, a smaller value of N' can be used corresponding to the number of rows that are to be used for resource allocation. Further, $\alpha(n_s)$ represents a mapping factor that can be utilized to map a cyclic shift index $n_{cs}(n_s)$ into a time delay. As the equations illustrate, this can be achieved by defining the cyclic shifts represented in resource grid 404 in terms of $N_{sc}^{RB}$ uniform angles on a unit circle, where $N_{sc}^{RB}$ is the number of cyclic shifts utilized in resource grid 404 (e.g., 12).

Figure 6:
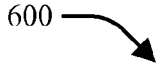

As additionally used in the above equations, $\Delta_{shift}^{PUCCH}$ is a shift increment value that can be used to define the distance between respectively indexed users in resource grid 404. By setting the value of the shift increment to various values, it can be appreciated that a tradeoff can be adjusted between interference and resource usage. For example, tables 500-700 in FIGS. 5-7 illustrate various resource grid mappings that can result from applying the above equations for varying values of $\Delta_{shift}^{PUCCH}$. In particular, table 500 in FIG. 5 illustrates a $\Delta_{shift}^{PUCCH}$ value of 2, which can be used to accommodate 18 users; table 600 in FIG. 6 illustrates a $\Delta_{shift}^{PUCCH}$ value of 3, which can be used to accommodate 12 users; and table 700 in FIG. 7 illustrates a $\Delta_{shift}^{PUCCH}$ value of 1, which can be used to accommodate 36 users.

As further used in the above equations, $n_{cs}^{cell}$ represents a global shift that can be applied to all elements in resource grid 404. This can be applied, for example, to mitigate the effects of interference between adjacent cells that utilize resource grids 404. In one example, $n_{cs}^{cell}$ can be generated based on the identifiers of respective cells in order to ensure that resource grids 404 have varying delays in time between neighboring cells. For example, $n_{cs}^{cell}$ can be generated as a pseudorandom value, which can be seeded by and/or otherwise generated as a function of an identifier for a cell implementing the value. Similarly, $\delta_{offset}^{PUCCH}$ represents another shifting factor that can be applied to resource grid 404 and/or a portion of resource grid 404 to be utilized for resource allocation (e.g., if N' is less than the total number of rows in resource grid 404). In one example, $\delta_{offset}^{PUCCH}$ can be a predetermined value, which can be a constant and/or determined based on a pre-specified function with respect to a cell identifier.

As the above equations further illustrate, resource allocation can differ based on whether a normal CP or an extended CP is utilized. As a non-limiting example, resource allocation in a normal CP case can utilize four orthogonal covers and occupy a first orthogonal cover, alternate between second and fourth orthogonal covers, and then occupy a third orthogonal cover as described above. Alternatively, resource allocation in an extended CP case can instead utilize three orthogonal covers and occupy each orthogonal cover in order until the orthogonal covers are respectively exhausted.

In accordance with one aspect, the resource allocation techniques described herein can yield a performance improvement over traditional techniques. For instance, traditional resource grid allocation techniques are utilized based on an evaluation of the orthogonality loss due to channel dispersion and the Doppler effect. It can be appreciated that orthogonality loss due to channel dispersion depends on cyclic shift separation and that orthogonality loss due to the Doppler effect depends on the element-wise product of the orthogonal cover pair. Further, it can be appreciated that the element-wise product of $n_{oc}(n_s)=1$ and that the set of $\{n_{oc}(n_s)=0, n_{oc}(n_s)=2\}$ is the same as the element-wise product of $n_{oc}(n_s)=3$ and the set of $\{n_{oc}(n_s)=0, n_{oc}(n_s)=2\}$. Put another way, the element-wise product of $n_{oc}(n_s)=1$ and the set of $\{n_{oc}(n_s)=0, n_{oc}(n_s)=2\}$ is $\{[+1\ -1\ +1\ -1], [+1\ +1\ -1\ -1]\}$, while the element-wise product of $n_{oc}(n_s)=3$ and the set of $\{n_{oc}(n_s)=0, n_{oc}(n_s)=2\}$ is $\{[+1\ +1\ -1\ -1], [+1\ -1\ +1\ -1]\}$. As a result, it can be appreciated that in a fully loaded PUCCH case, the loss of orthogonality due to channel dispersion for $n_{oc}(n_s)=1$ can be reduced due to the fact that the distance to the closest cyclic shift mapped to identical $n_{oc}(n_s)=1$ orthogonal covers is doubled, while the loss of orthogonality for the other cases is unchanged. Further, it can be appreciated that in a partially loaded PUCCH case, the $n'(n_s)$ can be populated with even values first such that the same orthogonality is maintained.

Figure 8:
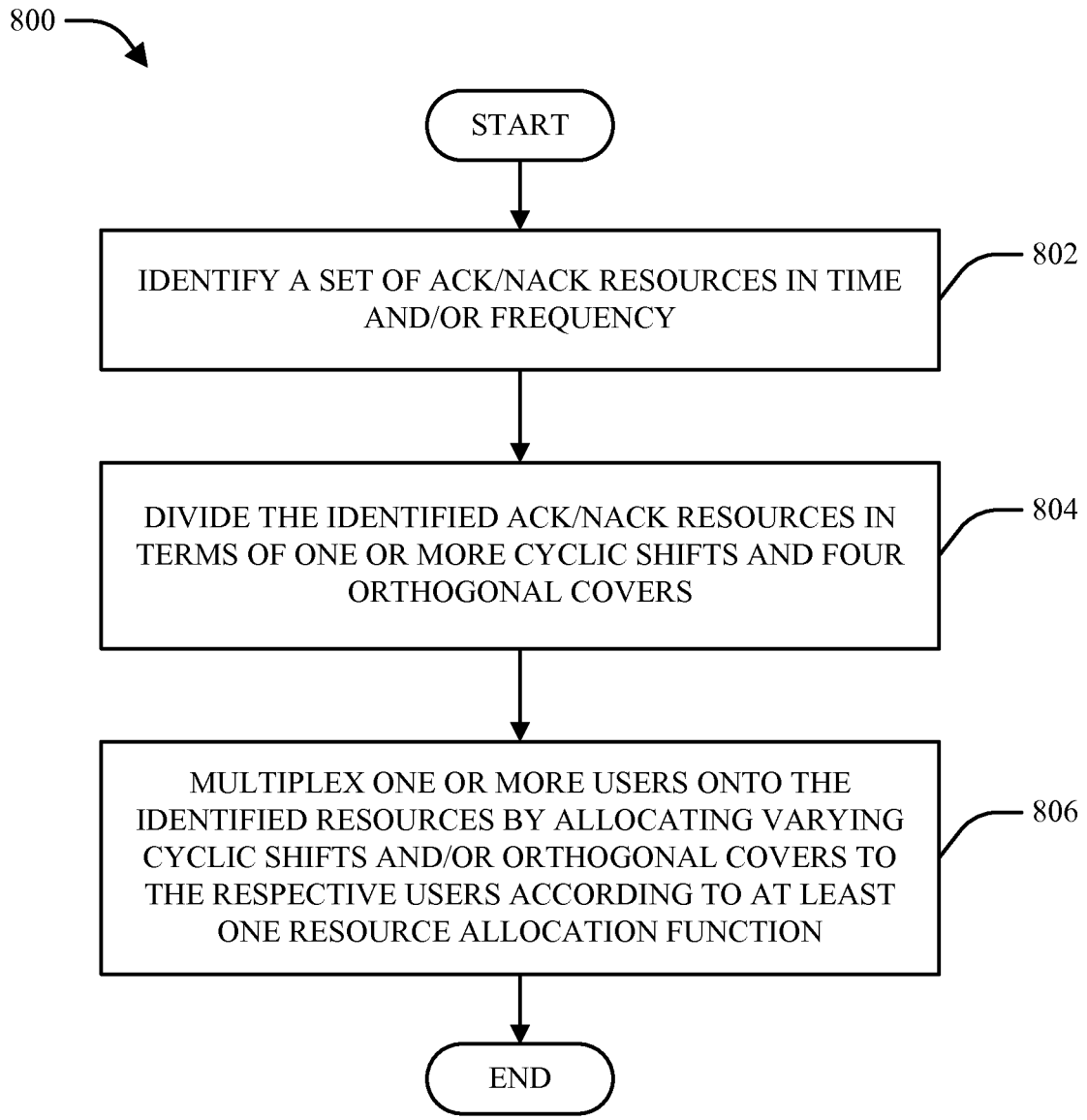
FIG. 8 is a flow diagram of a methodology for multiplexing one or more users onto a set of communication resources.
Figure 9:
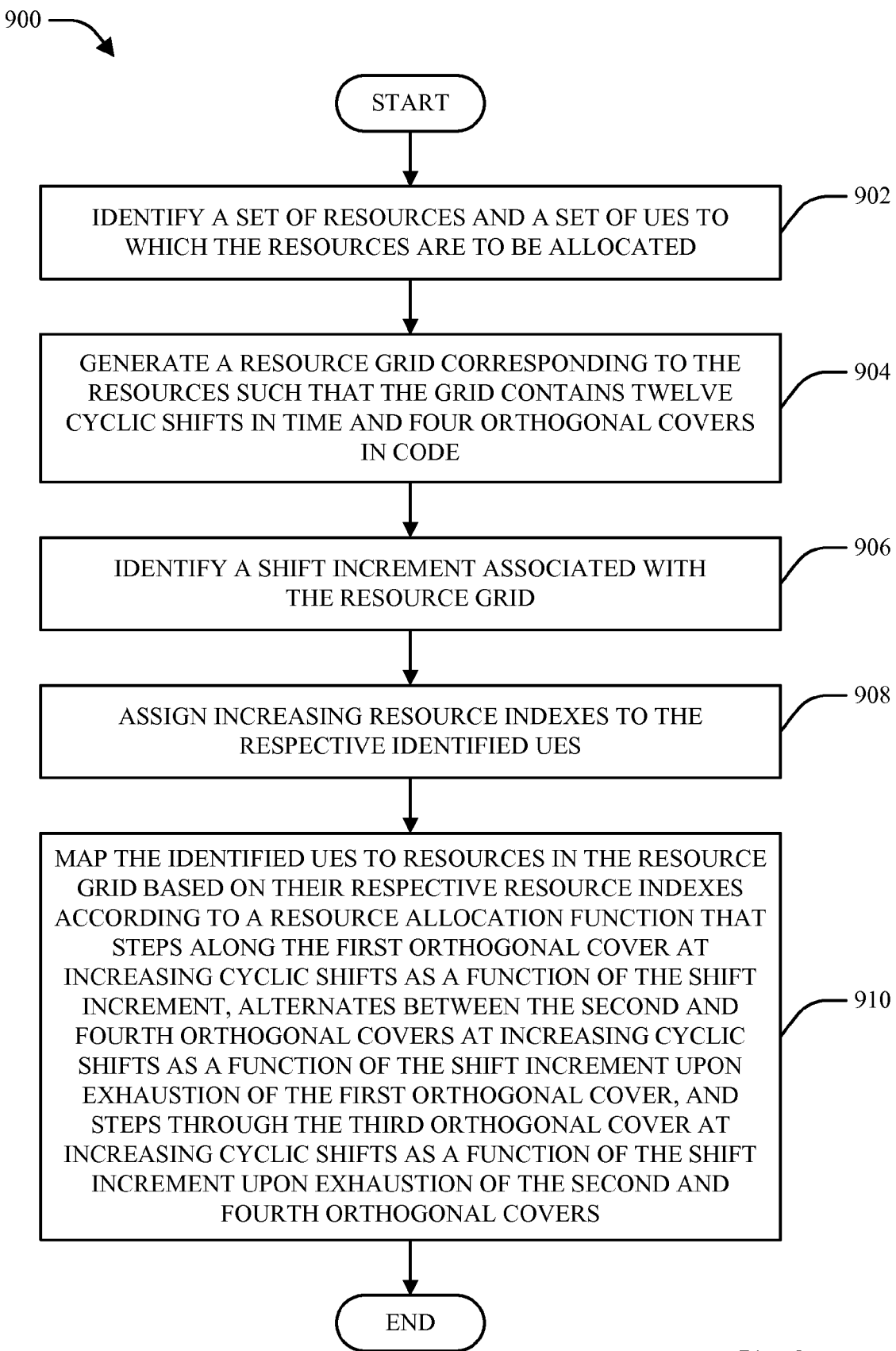
FIG. 9 is a flow diagram of a methodology for implementing a resource allocation function to map a set of indexed users to respective cyclic shifts and orthogonal covers corresponding to a control channel.

Referring now to FIGS. 8-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for multiplexing one or more users (e.g., UEs 120) onto a set of communication resources. It is to be appreciated that methodology 800 can be performed by, for example, a base station (e.g., base station 110) and/or any other appropriate network device. Methodology 800 begins at block 802, wherein a set of ACK/NACK resources in time and/or frequency is identified. Next, at block 804, the ACK/NACK resources identified at block 802 are divided in terms of one or more cyclic shifts and four orthogonal covers (e.g., as illustrated by data resource grid 404). Methodology 800 can then conclude at block 806, wherein one or more users are multiplexed onto the identified resources by allocating varying cyclic shifts and/or orthogonal covers (e.g., expressed as slots in resource grid 404) to the respective users according to at least one resource allocation function (e.g., the resource allocation functions described above).

FIG. 9 illustrates a methodology 900 for implementing a resource allocation function to map a set of indexed users to respective cyclic shifts and orthogonal covers corresponding to a control channel (e.g., PUCCH). Methodology 900 can be performed by, for example, an Evolved Node B (eNB) and/or any other suitable network device. Methodology 900 begins at block 902, wherein a set of resources and a set of UEs to which the resources are to be allocated are identified. At block 904, a resource grid corresponding to the resources identified at block 902 is generated such that the grid contains 12 cyclic shifts in time and 4 orthogonal covers in code. Next, at block 906, a shift increment associated with the resource grid (e.g., $\Delta_{shift}^{PUCCH}$) is identified. At block 908, increasing resource indexes (e.g., $n'(n_s)$) are assigned to the UEs identified at block 902.

Upon completion of the acts described at blocks 902-908, methodology 900 can conclude at block 910, wherein the UEs identified at block 902 are mapped to resources in the resource grid generated at 904 based on the resource indexes assigned to the UEs at block 908. Mapping at block 910 can occur based on a resource allocation function, which can be utilized to step along the first orthogonal cover at increasing cyclic shifts as a function of the shift increment, alternate between the second and fourth orthogonal covers at increasing cyclic shifts as a function of the shift increment upon exhaustion of the first orthogonal cover, and step through the third orthogonal cover at increasing cyclic shifts as a function of the shift increment upon exhaustion of the second and fourth orthogonal covers.

Figure 10:
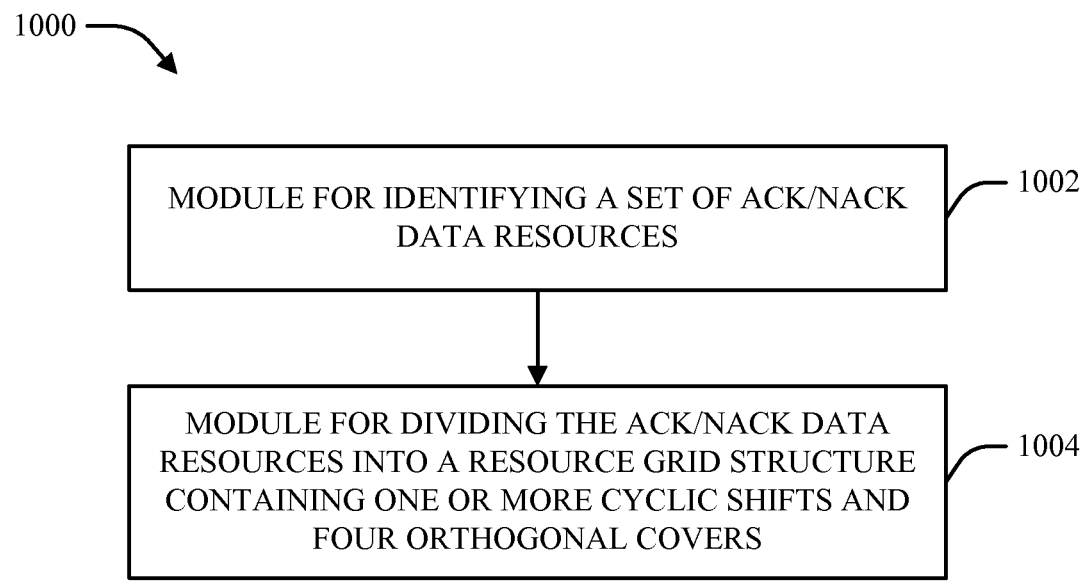
FIG. 10 is a block diagram of an apparatus that facilitates division of control resources for subsequent allocation.

Referring next to FIG. 10, an apparatus 1000 that facilitates division of control resources for subsequent allocation is illustrated. It is to be appreciated that apparatus 1000 is represented as including functional blocks, which can be functional blocks that represent functions implemented by a processor, software, or combination thereof (e.g., firmware). Apparatus 1000 can be implemented by a base station (e.g., base station 110) and can include a module 1002 for identifying a set of ACK/NACK data resources and a module 1004 for dividing the ACK/NACK data resources into a resource grid structure containing one or more cyclic shifts and four orthogonal covers.

Figure 11:
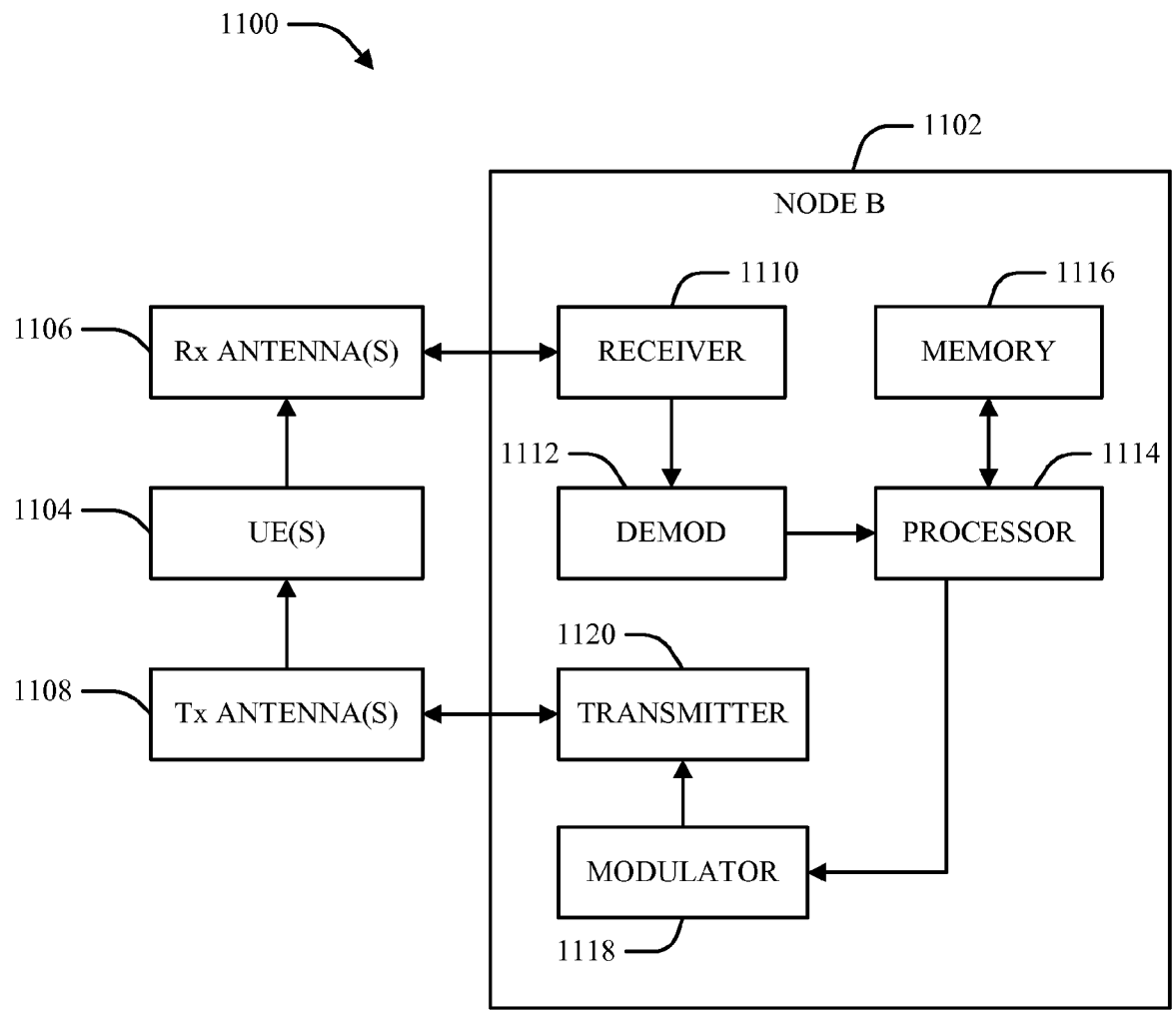
FIGS. 11-12 are block diagrams of respective wireless communication devices that can be utilized to implement various aspects of the functionality described herein.

FIG. 11 is a block diagram of a system 1100 that can be utilized to implement various aspects of the functionality described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108. Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 800, 900, and/or other similar and appropriate methodologies. Node B 1102 can also include a modulator 1118 that can multiplex a signal for transmission by a transmitter 1120 through transmit antenna(s) 1108.

Figure 12:
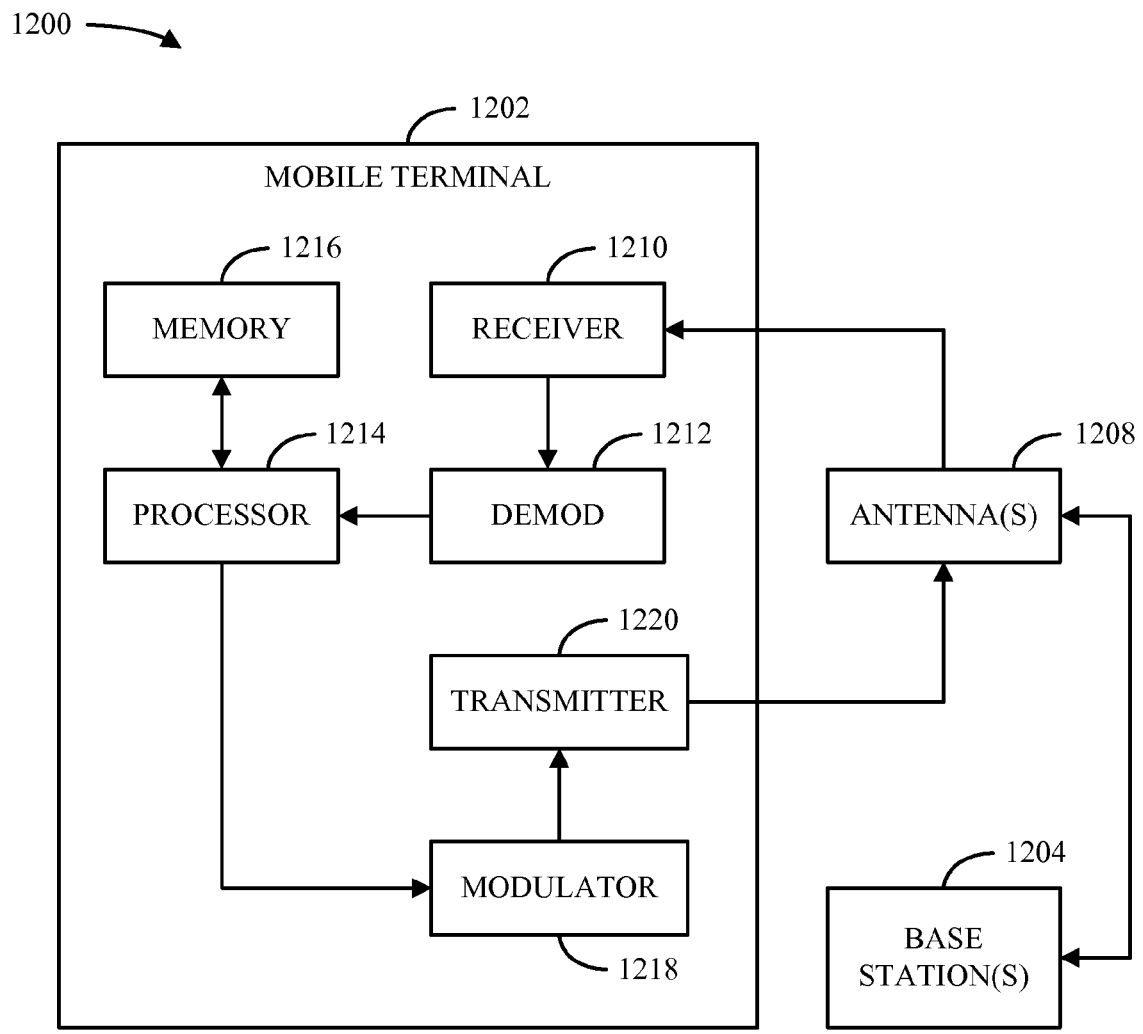

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Mobile terminal 1202 can also include a modulator 1218 that can multiplex a signal for transmission by a transmitter 1220 through antenna(s) 1208.

Figure 13:
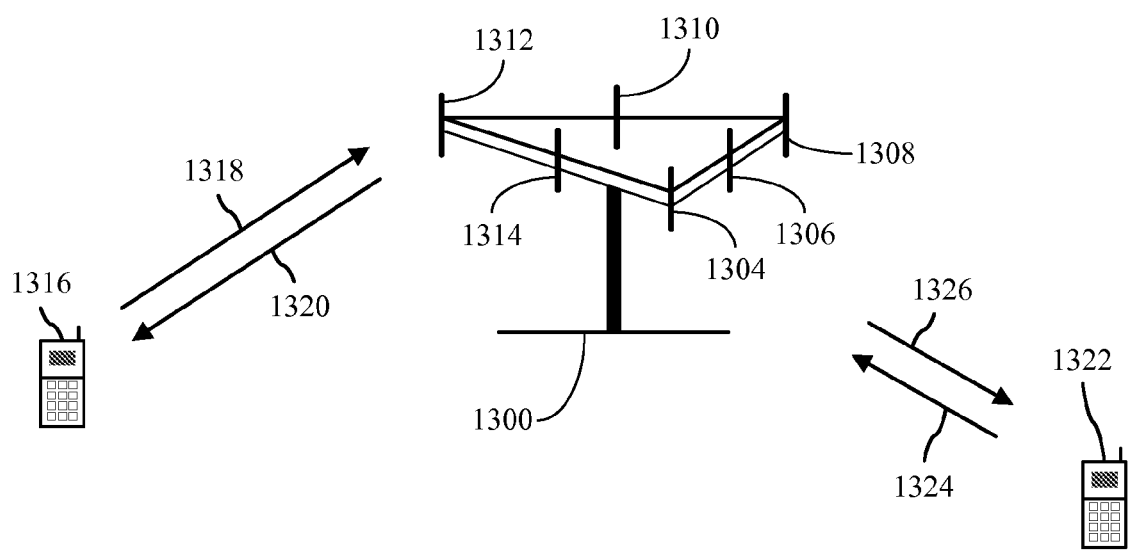
FIG. 13 illustrates a wireless multiple-access communication system in accordance with various aspects set forth herein.

Referring now to FIG. 13, an illustration of a wireless multiple-access communication system is provided in accordance with various aspects. In one example, an access point 1300 includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1313 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequency for communication. For example, forward link 1320 may use a different frequency then that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

An access point, e.g., access point 1300, can be a fixed station used for communicating with terminals and can also be referred to as a base station, a Node B, an access network, and/or other suitable terminology. In addition, an access terminal, e.g., an access terminal 1316 or 1322, can also be referred to as a mobile terminal, user equipment, a wireless communication device, a terminal, a wireless terminal, and/or other appropriate terminology.

Figure 14:
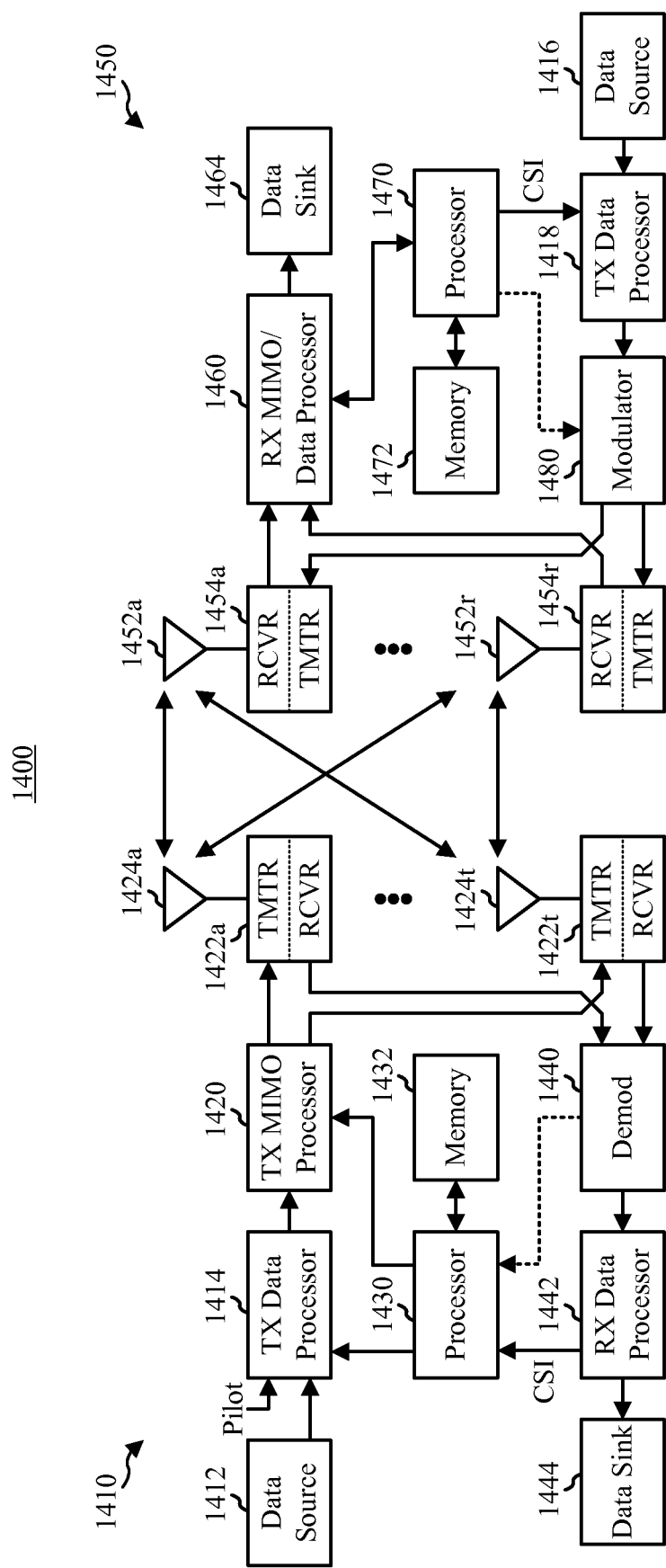
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and upconvert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and downconvert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX processor 1460 can then process each symbol stream at least in part by demodulating, deinterleaving, and decoding each detected symbol stream to recover traffic data for a corresponding data stream. Thus, the processing by RX processor 1460 can be complementary to that performed by TX MIMO processor 1420 and TX data processor 1416 at transmitter system 1410. RX processor 1460 can additionally provide processed symbol streams to a data sink 1464.

In accordance with one aspect, the channel response estimate generated by RX processor 1460 can be used to perform space/time processing at the receiver, adjust power levels, change modulation rates or schemes, and/or other appropriate actions. Additionally, RX processor 1460 can further estimate channel characteristics such as, for example, signal-to-noise-and-interference ratios (SNRs) of the detected symbol streams. RX processor 1460 can then provide estimated channel characteristics to a processor 1470. In one example, RX processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for resource allocation in a wireless communication system, comprising:
   identifying, by an apparatus, a set of acknowledgement (ACK)/negative acknowledgement (NACK) resources, wherein the set of ACK/NACK resources corresponds to a resource block comprising a plurality of data symbols and a plurality of demodulation reference signal (DM-RS) symbols;
   generating a resource grid corresponding to the set of ACK/NACK resources, wherein the resource grid has a first dimension corresponding to one or more cyclic shifts and a second dimension corresponding to four orthogonal covers, wherein the orthogonal covers correspond to orthogonal sequences used for transmission over the plurality of data symbols; and
   multiplexing one or more users onto the identified set of ACK/NACK resources at least in part by allocating resources corresponding to respective positions in the resource grid to respective users in the one or more users.

2. The method of claim 1, wherein the set of ACK/NACK resources corresponds to a Physical Uplink Control Channel (PUCCH).

3. The method of claim 1, wherein the orthogonal covers comprise Walsh codes.

4. The method of claim 1, wherein the plurality of data symbols comprises 4 data symbols.

5. The method of claim 1, wherein the one or more cyclic shifts comprise 12 cyclic shifts.

6. The method of claim 5, further comprising:
   mapping the cyclic shifts to respective angles corresponding to a unit circle; and
   assigning a cyclic shift corresponding to a position in the resource grid that a user has been allocated at least in part by scheduling an ACK/NACK transmission by the user on the allocated resources at a time delay corresponding to the angle mapped to the assigned cyclic shift.

7. The method of claim 1, wherein the multiplexing comprises allocating resources to respective users using the resource grid based at least in part on a resource allocation function.

8. The method of claim 7, wherein the multiplexing further comprises:
   assigning resource indexes to respective users to be allocated resources; and
   allocating resources to the respective users via the resource allocation function in increasing order based on the resource indexes corresponding to the users.

9. The method of claim 8, wherein the allocating resources to the respective users via the resource allocation function comprises:
   allocating increasing cyclic shifts to respective users on the first orthogonal cover;
   allocating increasing cyclic shifts to respective users alternating between the second and fourth orthogonal covers upon exhaustion of the first orthogonal cover; and
   allocating increasing cyclic shifts to respective users on the third orthogonal cover upon exhaustion of the second and fourth orthogonal covers.

10. The method of claim 9, wherein the allocating resources to the respective users via the resource allocation function further comprises increasing cyclic shifts allocated for respective adjacently indexed users according to a shift increment value.

11. The method of claim 1, further comprising shifting the resource grid in time by an amount determined as a function of a cell identifier.

12. The method of claim 11, wherein the shifting comprises determining the amount for the shifting as a pseudorandom value that is generated as a function of the cell identifier.

13. A wireless communications apparatus, comprising:
   a memory that stores data relating to acknowledgement (ACK) channel resources, wherein the ACK channel resources comprise a resource block, the resource block comprising a plurality of data symbols and a plurality of pilot symbols, a set of user equipments (UEs) to be allocated ACK channel resources, and a set of four orthogonal covers; and
   a processor configured to generate a resource grid for the ACK channel resources having a first dimension corresponding to one or more cyclic shifts and a second dimension corresponding to the four orthogonal covers, wherein the orthogonal covers correspond to orthogonal sequences used for transmission over the plurality of data symbols and to multiplex one or more users onto the identified set of ACK channel resources at least in part by allocating resources corresponding to respective positions in the resource grid to respective users in the one or more users.

14. The wireless communications apparatus of claim 13, wherein the ACK channel resources correspond to a Physical Uplink Control Channel (PUCCH).

15. The wireless communications apparatus of claim 13, wherein the orthogonal covers comprise Walsh codes applied to respective signals transmitted over the plurality of data symbols in the resource block.

16. The wireless communications apparatus of claim 13, wherein the processor is further configured to generate the one or more cyclic shifts in terms of angles on a unit circle.

17. A wireless communications apparatus, comprising:
   a memory that stores data relating to acknowledgement (ACK) channel resources, a set of user equipments (UEs) to be allocated ACK channel resources, and a set of four orthogonal covers, wherein the memory further stores data relating to resource indexes respectively associated with the set of UEs to be allocated ACK channel resources and a resource allocation function and;
   a processor configured to generate a grid for the ACK channel resources having a first dimension corresponding to one or more cyclic shifts and a second dimension corresponding to the four orthogonal covers and to allocate ACK channel resources corresponding to respective slots in the resource grid to respective UEs, wherein the processor is further configured to allocate resources to respective UEs using the resource allocation function in increasing order of the resource indexes respectively associated with the UEs.

18. The wireless communications apparatus of claim 17, wherein the processor is further configured to utilize the resource allocation function at least in part by allocating resources for respective UEs associated with cyclic shifts for the first orthogonal cover, cyclic shifts alternating between the second and fourth orthogonal covers upon exhaustion of the first orthogonal cover, and cyclic shifts for the third orthogonal cover upon exhaustion of the second and fourth orthogonal covers in increasing order of the resource indexes respectively associated with the UEs.

19. The wireless communications apparatus of claim 18, wherein the memory further stores data relating to an increment parameter and the processor is further configured to increment a cyclic shift allocation for respectively indexed UEs by the increment parameter.

20. An apparatus that facilitates resource allocation in a wireless communication system, the apparatus comprising:
- means for identifying a set of acknowledgement (ACK)/negative acknowledgement (NACK) resources, wherein the set of ACK/NACK resources corresponds to a resource block comprising a plurality of data symbols and a plurality of demodulation reference signal (DM-RS) symbols; and
- means for generating a resource grid structure for allocation of the identified ACK/NACK resources, wherein the resource grid structure is defined with respect to at least one cyclic shift and four orthogonal covers, wherein the orthogonal covers correspond to orthogonal sequences used for transmission over the plurality of data symbols.

21. The apparatus of claim 20, wherein the set of ACK/NACK resources corresponds to a Physical Uplink Control Channel (PUCCH).

22. The apparatus of claim 20, further comprising means for generating the at least one cyclic shift in terms of respective angles on a unit circle.

23. An apparatus that facilitates resource allocation in a wireless communication system comprising:
- means for identifying a set of acknowledgement (ACK)/negative acknowledgement (NACK) resources;
- means for generating a resource grid structure for allocation of the identified ACK/NACK resources, wherein the resource grid structure is defined with respect to at least one cyclic shift and four orthogonal covers;
- means for indexing respective users to be allocated ACK/NACK resources; and
- means for allocating ACK/NACK resources to the indexed users according to their respective indexes.

24. The apparatus of claim 23, wherein the means for allocating ACK/NACK resources comprises means for allocating resource slots in the resource grid structure to respective indexed users, wherein resources allocated to respective users correspond to cyclic shifts for the first orthogonal cover, cyclic shifts alternating between the second and fourth orthogonal covers upon exhaustion of the first orthogonal cover, and cyclic shifts for the third orthogonal cover upon exhaustion of the second and fourth orthogonal covers.

25. The apparatus of claim 23, wherein the means for allocating ACK/NACK resources further comprises means for incrementing a cyclic shift allocation for respectively indexed users by a preconfigured increment parameter.

26. A computer program product, comprising:
a non-transitory computer-readable medium, comprising:
- code for causing a computer to generate a resource grid for a set of acknowledgment (ACK)/negative acknowledgment (NACK) resources at least in part by defining a first dimension of the resource grid in terms of at least one cyclic shift and defining a second dimension of the resource grid in terms of four orthogonal covers;
- code for causing a computer to index respective terminals to which ACK/NACK resources are to be assigned; and
- code for causing a computer to allocate slots in the resource grid to the respective terminals to which the ACK/NACK resources are to be assigned as a function of respective indexes associated with the terminals.

27. The computer program product of claim 26, wherein the code for causing a computer to allocate further comprises code for causing a computer to allocate slots in the resource grid associated with the first orthogonal cover, slots in the resource grid alternating between the second orthogonal cover and the fourth orthogonal cover upon exhaustion of the slots in the resource grid corresponding to the first orthogonal cover, and slots in the resource grid associated with the third orthogonal cover upon exhaustion of the slots in the resource grid corresponding to the second orthogonal cover and the fourth orthogonal cover to respective terminals as a function of the indexes respectively associated with the terminals.

28. A method used in a wireless communication system, the method comprising:
- generating a resource grid corresponding to Physical Uplink Control Channel (PUCCH) resources, wherein a first dimension of the resource grid is defined by twelve cyclic shifts in time and a second dimension of the resource grid is defined by four orthogonal covers in code;
- identifying a shift increment parameter;
- assigning increasing resource indexes to respective user equipments (UEs) to be allocated PUCCH resources; and
- allocating PUCCH resources to the indexed UEs at least in part by allocating respective slots in the resource grid to respective UEs according to at least one resource allocation function that steps along a first orthogonal cover in the resource grid at increasing cyclic shifts as a function of the shift increment parameter, alternates between second and fourth orthogonal covers at increasing cyclic shifts in the resource grid as a function of the shift increment parameter upon exhaustion of the first orthogonal cover, and steps through a third orthogonal cover in the resource grid at increasing cyclic shifts as a function of the shift increment parameter upon exhaustion of the second and fourth orthogonal covers.

29. A method that facilitates resource allocation in a wireless communication system comprising:
- identifying, by an apparatus, a set of acknowledgement (ACK)/negative acknowledgement (NACK) resources;
- generating a resource grid structure for allocation of the identified ACK/NACK resources, wherein the resource grid structure is defined with respect to at least one cyclic shift and four orthogonal covers;
- indexing respective users to be allocated ACK/NACK resources; and
- allocating ACK/NACK resources to the indexed users according to their respective indexes.

30. The method of claim 29, wherein the allocating ACK/NACK resources comprises allocating resource slots in the resource grid structure to respective indexed users, wherein resources allocated to respective users correspond to cyclic shifts for the first orthogonal cover, cyclic shifts alternating between the second and fourth orthogonal covers upon exhaustion of the first orthogonal cover, and cyclic shifts for the third orthogonal cover upon exhaustion of the second and fourth orthogonal covers.

31. The method of claim 29, wherein the allocating ACK/NACK resources further comprises incrementing a cyclic shift allocation for respectively indexed users by a preconfigured increment parameter.

* * * * *